(12) United States Patent
Hagen (10) Patent No.: US 8,435,772 B2
(45) Date of Patent: May 7, 2013

(54) NITROGEN COMPOUND PRODUCTION METHOD AND SYSTEM

(76) Inventor: Tony A. Hagen, Sioux Falls, SD (US)

( * ) Notice: Subject to any disclaimer, the term of this patent is extended or adjusted under 35 U.S.C. 154(b) by 82 days.

(21) Appl. No.: 13/039,494

(22) Filed: Mar. 3, 2011

(65) Prior Publication Data

US 2011/0151523 A1   Jun. 23, 2011

(51) Int. Cl.
- *C12P 7/10* (2006.01)
- *C12P 7/08* (2006.01)
- *A61K 36/00* (2006.01)

(52) U.S. Cl.
USPC .................... 435/165; 435/163; 424/725

(58) Field of Classification Search .................. None
See application file for complete search history.

(56) References Cited

U.S. PATENT DOCUMENTS

| | | | |
|---|---|---|---|
| 7,135,308 B1 | 11/2006 | Bush et al. | |
| 2003/0024874 A1 | 2/2003 | Wallace | |
| 2005/0061737 A1 | 3/2005 | Linden et al. | |
| 2008/0176304 A1 | 7/2008 | Lee | |
| 2008/0311640 A1* | 12/2008 | Cox et al. | 435/168 |

OTHER PUBLICATIONS

Journal of Experimental Botany vol. 51, No. 349 pp. 1413-1422 Aug. 2000.

* cited by examiner

*Primary Examiner* — Chris R Tate
*Assistant Examiner* — Russell Fiebig (57) ABSTRACT

A nitrogen compound production method includes the step of establishing at least one aquatic plant in a cell containing water and alternating a step of inhibiting photosynthesis inducing light from reaching the at least one aquatic plant and a step of allowing photosynthesis inducing light to reach the at least one aquatic plant. The step of inhibiting photosynthesis inducing light defines a dark phase. A concentration of oxygen is reduced in the water to define an anoxic condition. During the anoxic condition, the at least one plant releases nitrogen compounds into the water and these nitrogen compounds are collected from the water contained in the cell.

10 Claims, 5 Drawing Sheets

NITROGEN COMPOUND PRODUCTION METHOD AND SYSTEM

BACKGROUND OF THE DISCLOSURE

Field of the Disclosure

The disclosure relates to nitrogen compound production and collection systems and methods and more particularly pertains to a new nitrogen compound production method for promoting plant growth by plants which produce free nitrogen compounds during anaerobic metabolism to form a self-sustaining cycle of plant growth and nitrogen compound production. The disclosure also relates to a system for collecting, purifying, and/or extracting nitrogen compounds produced during anaerobic metabolism by aquatic plants.

SUMMARY OF THE DISCLOSURE

An embodiment of the disclosure meets the needs presented above by generally comprising the step of establishing at least one aquatic plant in a cell containing water and alternating a step of inhibiting photosynthesis inducing light from reaching the at least one aquatic plant and a step of allowing photosynthesis inducing light to reach the at least one aquatic plant. The step of inhibiting photosynthesis inducing light defines a dark phase. A concentration of oxygen is reduced in the water to define an anoxic condition. During the anoxic condition, the at least one plant releases nitrogen compounds into the water and these nitrogen compounds are collected from the water contained in the cell.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 5 thereof, a new fertilizer production method embodying the principles and concepts of an embodiment of the disclosure and generally designated by the reference numeral 10 will be described.

A new nitrogen fertilizer production method embodying the principles and concepts of an embodiment of the disclosure and generally designated by the reference numeral 10 will be described.

As illustrated in FIGS. 1-5, the method 10 and system of stimulating nitrogen fertilizer compound production and growth of aquatic plants includes generally growing aquatic plants in one or more cells. Systems for the isolation of nitrogen compounds from an aquatic plant are provided herein based on the methods described below. The aquatic plants may be obtained and placed in the cell in any conventional manner such as gathering the plants from lakes or ponds, growing them in tanks or growing them directly in the cell. As the method 10 is performed, it may be used to grow and provide aquatic plants as they are needed for future cells or for replacement purposes. The type of water used in the cell will vary based on the plant type, but fresh water, salt water and brackish water are all suitable for various embodiments.

Each cell is constructed to hold water and may or may not be lined to prevent transfer of fluids and gases into a ground surface supporting the cell. The cells are dimensioned to hold one or more aquatic plants. The dimensions of cells will depend on the size and type of aquatic plant used, and on the depth required for the chosen aquatic plant to properly grow without restriction. The depth of each cell can range from about 10 cm to about 20 m (e.g., 10 cm to 100 cm, 50 cm to 1 m, 100 cm to 1 m, 500 cm to 3 m, 1 m to 5 m, 4 m to 10 m, 5 m to 7 m, 5 m to 10 m, or 10 m to 20 m). It has been found that some plants may grow in dramatically deeper depths providing other environmental factors, such as atypically high water temperatures at depth, are present. For instance, *Stuckenia pectinata* has been shown to grow in depths of greater than 20 m of water where thermal vents provide at least warmer water than would be typically found in a North American lake at such depths.

The width and length of a cell is not crucial to the system. It is to be understood that the cell width and length need not be equal, and can be adjusted to accommodate the number and type of plant to be used in the system, and can further depend on the cell shape, available land area, access to raw materials, and cost controls. When a cell is dimensioned to hold a single plant, it may be advantageous to include more than one cell in the system.

The cell may also be temperature controlled and in particular the cell should be prevented from freezing which may kill the aquatic plants. Heat for cells may be sequestered from waste heat emitted by adjacent ethanol processing plants or any other convenient source of waste heat. Additional heat sources, such as geothermic and solar, may also be utilized where convenient. In one embodiment, water exiting a waste water treatment plant or electricity facility may be utilized both to regulate temperature and to provide additional nutrients to the aquatic plants. Additionally, in particularly hot climates, the cells may require cooling to prevent temperatures that would otherwise harm the plants. Depending on the variety of aquatic plant being utilized, a temperature range may be selected which optimizes plant growth and nitrogen compound production. For example, some selected plants such as *Stuckenia pectinata* may be maintained between 85° Fahrenheit and 73° Fahrenheit for optimal growth, though it should be understood that the overall temperature range for growth and production of nitrogen compounds falls into a much wider range. One manner of controlling temperature is to sink the cell into the ground where the soil around the cell will moderate the temperature of the cell.

A substrate, for example a fine particulate, may be placed in the cells and the aquatic plants introduced into the cells where they can anchor themselves in the particulate. A fine particulate may be used as it may promote less energy expenditure on the part of the aquatic plants to root growth into the particulate and retains a higher percentage of the plant matter above the surface of the particulate.

While some of the plants being utilized by the method 10 may rely on their root systems as anchoring means, and therefore any type of anchoring mechanism or substrate may be used which can be engaged by the roots, some of the plants may require soil for collection of nutrients as well as a means for promoting root growth in those plants that store nutrients and carbohydrates within their roots. Additionally, a denser particulate may be useful where water flow within the cell requires a stouter anchoring substrate. Thus, a cell of a system provided herein may include mechanical anchoring devices, such as grids or screens, to which the roots may engage and couple themselves.

An aquatic plant may be selected from any number of aquatic plants which readily live in or on an aquatic environment such as directly in water or in permanently saturated soil. More generally, the term "aquatic plant" may include any algae, aquatic plant or semi-aquatic plant which has a high tolerance for either being constantly submerged in water or intermittently submerged during periods of flooding. Further, more than one type of aquatic plant may be used within a single cell.

The aquatic plants may include, for example, algae, submersed aquatic herbs such as, but not limited to, *Stuckenia pectinata* (formerly known as *Potamogeton pectinatus*), *Potamogeton crispus*, *Potamogeton distintcus*, *Potamogeton nodosus*, *Ruppia maitima*, *Myriophyllum spicatum*, *Hydrilla verticillata*, *Elodea densa*, *Hippuris vulgaris*, *Aponogeton boivinianus*, *Aponogeton rigidifolius*, *Aponogeton longiplumulosus*, *Didiplis diandra*, *Vesicularia dubyana*, *Hygrophilia augustifolia*, *Micranthemum umbrosum*, *Eichhornia azurea*, *Saururus cernuus*, *Cryptocoryne lingua*, *Hydrotriche hottoniiflora*, *Eustralis stellata*, *Vallisneria rubra*, *Hygrophila salicifolia*, *Cyperus helferi*, *Cryptocoryne petchii*, *Vallisneria americana*, *Vallisneria torta*, *Hydrotriche hottoniflora*, *Crassula helmsii*, *Limnophila sessiliflora*, *Potamogeton perfoliatus*, *Rotala wallichii*, *Cryptocoryne becketii*, *Blyxa aubertii* and *Hygrophila difformmis*, duckweeds such as, but not limited to, *Spirodela polyrrhiza*, *Wolffia globosa*, *Lemna trisulca*, *Lemna gibba*, *Lemna minor*, and *Landoltia punctata*, water cabbage, such as but not limited to *Pistia stratiotes*, buttercups such as but not limited to *Ranunculus*, water caltrop such as but not limited to *Trapa natans* and *Trapa bicornis*, water lily such as *Nymphaea lotus*, *Nymphaeaceae* and *Nelumbonaceae*, water hyacinth such as but not limited to *Eichhornia crassipes*, *Bolbitis heudelotii*, and *Cabomba*, and seagrasses such as but not limited to *Heteranthera zosterifolia*, *Posidoniaceae*, *Zosteraceae*, *Hydrocharitaceae*, and *Cymodoceaceae*. Moreover, in one of the various embodiments, a host alga may be selected from the group consisting of green algae, red algae, brown algae, diatoms, marine algae, freshwater algae, unicellular algae, multicellular algae, seaweeds, cold-tolerant algal strains, heat-tolerant algal strains, ethanol-tolerant algal strains, and combinations thereof.

The aquatic plants in general may also be selected from one of the plant families which include Potamogetonaceae, Ceratophyllaceae, Haloragaceae, Ruppiaceae and naturally occurring hybrids thereof. More particularly, the aquatic plants chosen may have a large Pasteur effect which increases the ratio of anaerobic $CO_2$ production to the aerobic $CO_2$ production. Typically this ratio is on the order of 1:3, but aquatic plants such as for example *Stuckenia pectinata*, formerly and also sometimes known as *Potamogeton pectinatus*, and commonly known as Sago Pondweed, may increase this ratio to 2:1 as explained in "Anoxia tolerance in the aquatic monocot *Potamogeton pectinatus*: absence of oxygen stimulates elongation in association with an usually large Pasteur effect," Journal of Experimental Botany, Volume 51, Number 349, pp. 1413-1422, August 2000, which is incorporated herein by reference. During an elongation process which takes place in a dark and anoxic environment, the plant elongates to form cellular chambers which will later be used to store carbohydrates formed during aerobic metabolism through an aerobic process of the aquatic plant. These carbohydrates can then be used to release ethanol during anaerobic metabolism through an anaerobic process of the aquatic plant. Generally, the equations are as follows:

Aerobic plant metabolism: $6CO_2+6H_2O \rightarrow 6O_2+C_6H_{12}O_6$

Furthermore, during anoxia, through less understood mechanisms, nitrogen compounds useful in fertilizers may also be released by the plants. In particular, these nitrogen compounds contain for instance NO2, NO3 and amino acids such as alanine, may be released into the cell as well.

Once an aquatic plant is established in a cell, an anaerobic process is initiated in the aquatic plant, which facilitates the formation of nitrogen compounds. In one embodiment the anaerobic process is initiated or facilitated by creating an anoxic condition (also referred to as anaerobic condition herein) in the cell. The term "anoxic" is here defined as a level of oxygen depletion that induces the plant to enter or maintain an anaerobic metabolic condition. Thus, an anoxic condition can be sufficient to reduce or maintain a level of intracellular oxygen in the plant to facilitate an anaerobic process or metabolism in the plant.

There are several approaches for creating an anoxic condition in the cell, and each approach may be used independently or in combination with one or more other approaches. In one embodiment, an anoxic condition is created by depleting or reducing a concentration of oxygen in the water contained in the cell. This may be accomplished by introducing water into the cell that is severely depleted (i.e. rendered anoxic) of oxygen through the use of organic, chemical, or mechanical means. This may also be accomplished by removing oxygen from water contained in the cell. It should be understood that the term "anoxic" does not necessarily indicate a complete absence of oxygen in the water, as a very small quantity of oxygen will likely be dissolved in the water.

This embodiment and other embodiments of the invention can be practiced with multiple cells wherein anoxic water and oxygenated water are rotated between the cells as needed to alternate between an anoxic condition and an oxygenated condition. For example, the process of utilizing multiple cells may include a first cell having anoxic water therein, which is moved into a second cell having previously been oxygenated. The anoxic water replaces the removed oxygenated water in the second cell to create at least a partial anoxic condition in the second cell, wherein any remaining $O_2$ may be removed by respiration of the plant or other means described herein. Within the second cell nitrogen compound formation is then stimulated.

Alternatively or additionally, oxygen reducing additives such as corn, yeast, bacteria (e.g., genetically altered bacteria and/or bacteria capable of fermentation), or enzymes, which consume oxygen and sugars while producing carbon dioxide, may be added to the cell to deplete the oxygen levels. In order to promote the depletion of oxygen levels, a secondary carbohydrate source, for instance corn, molasses, wheat or other sources of sugar, may be added to the water for use by the oxygen reducing additives. The secondary carbohydrate source may be added along with yeast to cause a strong enough reaction to remove a significant amount of oxygen from the system. It should be understood that if sufficient density of plant material is present within the cell, the plant material may itself remove the $O_2$ by way of plant respiration, though such a process may require several days to bring the cell to the anoxic condition.

The lack of sufficient oxygen in the water facilitates the anaerobic process in the aquatic plants causing them to release nitrogen compounds into the cell. The production of nitrogen compound may be further encouraged by the introduction of chemical catalysts and $CO_2$. Suitable chemical catalysts include acetic acid and 2,4-dichlorophenoxyacetic acid (known generically as 2,4d). CO2 may be obtained from waste sources such as electricity facilities and petroleum refineries. Additional nutrients and salts such as salts of potassium, nitrogen and phosphorus may further be added to promote growth of the aquatic plants. Further, depending upon the species of aquatic plant being utilized, organic substrates, including but not limited to those such as sucrose, glucose and acetate, may also be added to the cell.

During the anaerobic process, the aquatic plants can increase in size and may achieve a lengthening of up to 10 times or more of its original length. The term 'size' here is to be understood to include a volume increase of plant matter. Additionally during the anaerobic process, nitrogen compounds are produced and released by the aquatic plants. These nitrogen compounds are then held within the water of the cell until it is removed by methods further disclosed below.

This anaerobic process may take place from one to several days. In the case of *Potamogeton pectinatus* (or *Stuckenia pectinata*) a total of six days may suffice, though longer periods, such as up to 14 days may be more beneficial to maximize output efficiencies. The time required will depend on many factors such as light diffusion, availability of nutrients, size of the cell, size of the plant, plant variety and carbon content of the plant. The plant may be allowed to stay in anoxic conditions for up to several weeks. The determination of length of time is primarily dependent upon maximizing output of nitrogen compounds. When the plant decreases its nitrogen compound production beyond useful parameters, there may be no need to retain it in the anoxic conditions. Further, the pH of the cell must be monitored to prevent the water from becoming acidic during the anoxic condition. It has been found that while the initial pH may not be crucial to the process of forming nitrogen compounds but if the pH decreases during anoxia, the plant may switch from nitrogen compound formation to ethanol formation.

More problematic for the method 10 is the plant's mechanism of drawing nitrogen compounds out of the cell when the plant switches from nitrogen compound production to ethanol formation. The plant will also attempt to draw nitrogen compounds from the cell when the anoxic condition is terminated. Therefore, when the anoxic condition is terminated with or without the addition of photosynthetic light, it will be beneficial to inject nitrogen into the cell to replenish the plants stores of nitrogen compounds. Additionally, since the method 10 may generally be used for ethanol formation as well (see U.S. patent application Ser. No. 12/940,477 filed Nov. 5, 2010 and incorporated herein by reference), nitrogen may be injected into the cell if the pH drops intentionally or otherwise to ensure that the plant has access to adequate quantities of nitrogen for the health of the plant. This may be accomplished by the injection of $N_2$ into the cell using conventional means such as those discussed herein for also injecting $CO_2$ into the cell. In this manner, the plant will convert gaseous $N_2$ into collectable nitrogen compounds containing which are useful for fertilization purposes. Additionally, other sources of nitrogen may be introduced into the cell for use by the plant. This may include, for instance, waste water having complex nitrogen compounds therein which can be broken down by the plant and converted into nitrogen compounds beneficial for use in fertilizers.

The general tendency is for the cell to attempt to self regulate its pH and therefore steps may be taken to buffer the pH of the cell to avoid large shifts in pH. For instance, increased acidity may be counteracted with calcium buffering compounds such as calcium carbonate and calcium chlorate, but will ultimately be dependent upon the tolerances of the particular aquatic plant species in the cell.

In another embodiment, the anaerobic process may be initiated and/or facilitated by regulating the amount of photosynthesis inducing light that is allowed to reach the plant. In particular, during the anaerobic period, the cell may be shielded from light sources which encourage photosynthesis. This lack of light encourages the anaerobic process and the release of nitrogen compounds and prevents the formation of oxygen through photosynthesis which would take the cell back out of its anoxic condition. It should be understood, that the formation of the nitrogen compound requires only anoxia, but the anoxia condition may be dissipated if photosynthesis is allowed to occur. The light may be regulated by any conventional method to create dark conditions within the cell. It should be understood that the term "light" which should be blocked only applies to those forms of radiation, or wavelengths of light, which act as a photosynthesis catalyst and is dependent upon the type of chemical receptors used by each plant. Therefore, the term "dark" as used herein is meant to denote the substantial absence of the frequencies of light which promote photosynthesis.

Various means for regulating (e.g., selectively blocking/allowing) photosynthesis inducing light to reach the aquatic plant may be utilized. Such means include, for instance, barriers, covers, domes or other enclosure structure, which serve as a light barrier at least during the anaerobic process. These aforementioned barriers, covers, etc., may be removable when it is no longer desired to maintain the aquatic plant in an anaerobic condition. In one embodiment, the cells are illuminated by light visible to humans but which facilitates the "dark" condition for the plant. Other suitable regulation means include light filters that diffuse photosynthesis inducing light. Artificial lights sources may be used to preserve the dark condition and/or to selectively allow photosynthesis when the anaerobic condition is not desired.

In further embodiments, the anaerobic process may be facilitated by covering the cells with one or more sealing barriers to regulate the movement of gasses (e.g., air, oxygen, $CO_2$, nitrogen, etc.) into and out of the cell. For example, a sealing barrier may prevent the unwanted introduction of oxygen into the cell. The sealing barrier (or an additional sealing barrier) may also be used to retain $CO_2$ within the cell, particularly if $CO_2$ is being added to the cell. Additionally, high $N_2$ levels may be maintained as well to further dilute any $O_2$ within the water or trapped between the seal and the cell. The sealing barrier would seal the cell to prevent fluid communication between the cell and the adjacent atmosphere. This will inhibit oxygen from entering the cell and will encourage the anaerobic process. The sealing barrier may be a translucent barrier to encourage the capturing of radiant heat from a light source which is either naturally and/or artificially used to provide light to the aquatic plants. The sealing barrier may or may not also constitute a light blocking barrier which, as discussed above, is positioned on the cell to prevent light from entering the cell during the anaerobic process. The sealing and light blocking barriers may be made of conventional materials. However, it should be understood that a dwelling, tank, dome or other structure constructed around the cell may also define sealing and light block barriers should they be used in such a capacity. Additionally, a heavier than air gas barrier, such as sulfur hexafluoride, may be used to form the gas sealing layer.

In one embodiment, the anaerobic process described above is preceded by, followed by or alternated with an aerobic process. The aerobic process is initiated and/or facilitated in the aquatic plant by creating an oxygenated condition in the cell, which facilitates the production and storage of carbohydrates by the aquatic plant. This oxygenated condition may be created by a variety of approaches, which may be used independently or in combination. In one embodiment, oxygenated water is added to the cell or oxygen is directly introduced into water contained in the cell. In another embodiment, the gas barrier is removed to allow the oxygen concentration of the water to naturally increase. Accordingly, the oxygenated condition may be accomplished by introducing oxygenated water into the cell, by removing anoxic water, injecting oxygen into the cell or combining these processes with the water being oxygenated naturally by plant releasing of oxygen and exposure to an oxygenated atmosphere.

In a further embodiment, which may be used independently or in combination with other embodiments, the aquatic plant is exposed to light to induce photosynthesis and to stop the anaerobic process by allowing an oxygenated condition within the cell, which initiates and/or facilitates the aerobic process. This "light condition" may be accomplished by manipulating the light regulating means and systems discussed herein. For example, a light barrier, cover, or filter etc., may be removed so that natural or artificial photosynthesis inducing light is allowed to reach the aquatic plant. Alternatively or additionally, a light barrier may remain in place and an artificial light source is regulated to allow photosynthesis inducing light to reach the aquatic plant.

During the aerobic process, waste materials, such as waste biomass from the method 10, industrial waste, municipal waste and the like may be added to the cell to provide nutrients to the aquatic plants. Additionally, maximum sunlight/artificial light filtration is encouraged as is temperature regulation to promote growth of the aquatic plants. The light itself may be intensified by the addition of artificial light.

Generally, the light phase is continued for between 1 day and 15 days, and more generally at least 3 to 6 days, to allow the aquatic plants to form sugars, though this time frame may be adjusted for plant specific requirements. During the aerobic process, as indicated above, the aquatic plants create carbohydrates through metabolic processes and then retain the carbohydrates within their elongated structures. The duration of the aerobic process is dependent upon a number of factors but will typically end when carbohydrate production begins to slow or reaches a predetermined level. With *Potamogeton pectinatus* (*Stuckenia pectinata*) this may be between 2 days and 14 days depending upon environmental conditions within the cell.

It has been found in particular that manipulating light and dark conditions can affect the manner in which the aquatic plants produce nitrogen compounds and sugars. For instance, some aquatic plants may be subjected to light for several continuous days defining a light phase followed by restriction of light for several continuous days defining a dark phase to facilitate the anaerobic, nitrogen compound producing, process. In one embodiment, a dark condition is timed to occur simultaneously or shortly before or after the initiation of an anaerobic condition, preferably within 3 days of one another. One plant, *Stuckenia pectinata*, has been shown to have a light phase for up to about 6 days after which its production of sugars levels off or reaches a predetermined optimal level. The term "day" with respect to the light phase is defined as between 12 hours and up to 24 hours of light within a 24 hour period, as it has been found that some plants require some darkness within 24 hours, typically lasting between 2 hours and 8 hours, for proper growth function. However, the term "day" with respect to dark phase is defined as a complete lack of photosynthetic activity for 24 hours. *Stuckenia pectinata* has a dark phase of between about 2 days and 30 days during which it may enter the anaerobic process and produce nitrogen compounds.

Once maximum carbohydrate formation, or a predetermined level of such, is approached an anaerobic process is again initiated to begin the process of carbohydrate metabolism and nitrogen compound formation. Although the process set forth above commences with an anaerobic phase followed by an aerobic phase, it will be appreciated that either phase can be initiated first after establishing the aquatic plant in the cell. The steps of creating anoxic conditions and oxygenated conditions can be repeated to continually promote elongation and nitrogen compound production followed by carbohydrate production. This creates a self-sustaining cycle as the plant growth replenishes both plant matter lost to plant senescence and those plants which no longer meet established tolerances of nitrogen compound production. Additional plant growth which cannot be used for replenishing purposes or for furnishing plant material for another cell may be removed and fermented using conventional methods to also produce ethanol. Carbon dioxide released during the fermentation process may be captured and returned to the cell to promote carbohydrate production or used to supply another cell, particularly one in an aerobic state, with carbon dioxide. Plant waste, both before or after the fermentation process, may further be used for replenishing nutrients to the cell as feed material and/or may be processed for biochemical industrial usage such as in ethanol and diesel biofuels, pharmaceuticals, cosmetics, ammonia, colorants, paints and the like. When the light phase ends, there may be a transition period between the oxygenated phase and the anoxic phase where the amount of oxygen is being depleted. During the transition period, it may be beneficial to add the yeast to the cell which will stimulate the reduction of the oxygen and will allow the yeast to produce the ethanol. Sugars or other carbohydrates added along with the yeast may further enhance anaerobic activity.

This three part cycle may more broadly be defined to include: 1) a recharge phase wherein the water is oxygenated and/or the plant is exposed to light so that carbohydrates are formed, 2) a transition phase wherein the water is being made anoxic, the cell is deprived of photosynthesis inducing light and/or yeast may be added to deplete oxygen, and 3) an anoxic phase wherein the plant enters an anaerobic process of releasing nitrogen compounds. A fourth phase may be defined as a second transition phase wherein the water is again allowed to become oxygenated. The phases may each be modified as taught herein to maximize plant growth and nitrogen compound output. In one method, the recharge phase may occur over 0.5-12 days, followed by 0.5-6 days of the transition phase, which is then followed by at least 2 days of anoxic phase which may be increased to more than 20 days depending on the type of plant being utilized. In another method, the recharge phase may occur over 3-6 days, followed by 2-6 days of the transition phase, which is then followed by at least 3 days of anoxic phase which may be increased to more than 20 days depending on the type of plant being utilized.

Additional steps may be taken to increase plant growth and to further stimulate the production of nitrogen compounds. For instance, in order to increase nitrogen compound formation and to prevent stagnation of the water, and eventual killing of the aquatic plants, the water can be continually agitated using a water agitation system to encourage the movement of water around and through the aquatic plants. This prevents the buildup of plant waste materials adjacent to the plant and brings nutrients to the plant. It has been further found that agitation of the water promotes the suspension of water additives such as yeast. The agitation will further remove material located on the plant itself such as for example debris, parasitic organisms, non-parasitic light blocking organisms and films. An agitation system may include any form of wave movement through the plants or a sustained flow of water through the plants. Such a water movement system may be fluidly coupled to a circulation loop which removes the nitrogen compounds from the water after the water is piped or otherwise directed from the cell and before the water is returned to the cell. In some embodiments, while water is outside the cell in such a system, nutrients, antibiotics, $O_2$, $CO_2$, yeast, or any other required or desired additives may be added to the water. Additionally, a circulation loop may be used to also remove the $O_2$ from the water to make the water anoxic before it is returned to the cell to create the anoxic condition. It may further be beneficial to alternate high flow rates with low flow rates as it has been found that some plants require periods of little to no flow to encourage photosynthesis.

It has also been found that controlling the life cycles of the aquatic plants may be beneficial in lengthening the life spans of the aquatic plants. In particular, the life of some of the aquatic plants terminates after the flowering of those plants. This can be prevented by the cutting off of a top portion of the aquatic plants before they can flower. Such cutting will stop some of the aquatic plants from reaching the surface of the water and flowering. The plants may also be systemically cut and partially harvested to remove dead plant material and to thin the cell to allow for adequate light diffusion into the cell. The material cut may be allowed to remain in the cell to replenish nutrients to the cell.

While the method 10 is being practiced, bacterial and algal blooms may occur which can be controlled by antibiotics, bi-sulfates, hops, algaecides, chlorination, ultraviolet light exposure and other common practices. However, it has been discovered that that method 10 produces free carbohydrates, and in particular monosaccharides, which encourage bacterial growth within the cell. For this reason, it has been found to be beneficial to introduce ethanol producing yeasts into the cell for the purpose of decreasing the carbohydrate concentrations and inhibiting bacterial growth. Alternatively, or in conjunction with yeast, enzymes or bacteria may also be used to decrease carbohydrate concentrations. The yeast may require replacement, particularly after the anoxic condition has been established and maintained for more than about three days, though this is dependent upon the strain of yeast being used. A secondary carbohydrate source may also be added to the system to cause the yeast to react more strongly. The introduction of yeast into the cell can be done at one or more time points during the method 10.

A plurality of methods may be useful for removing the nitrogen compounds from the cell. In particular, it may be stripped or condensed out using conventional methods. Additionally, the nitrogen compounds may be removed as a precipitate.

Figure 1:
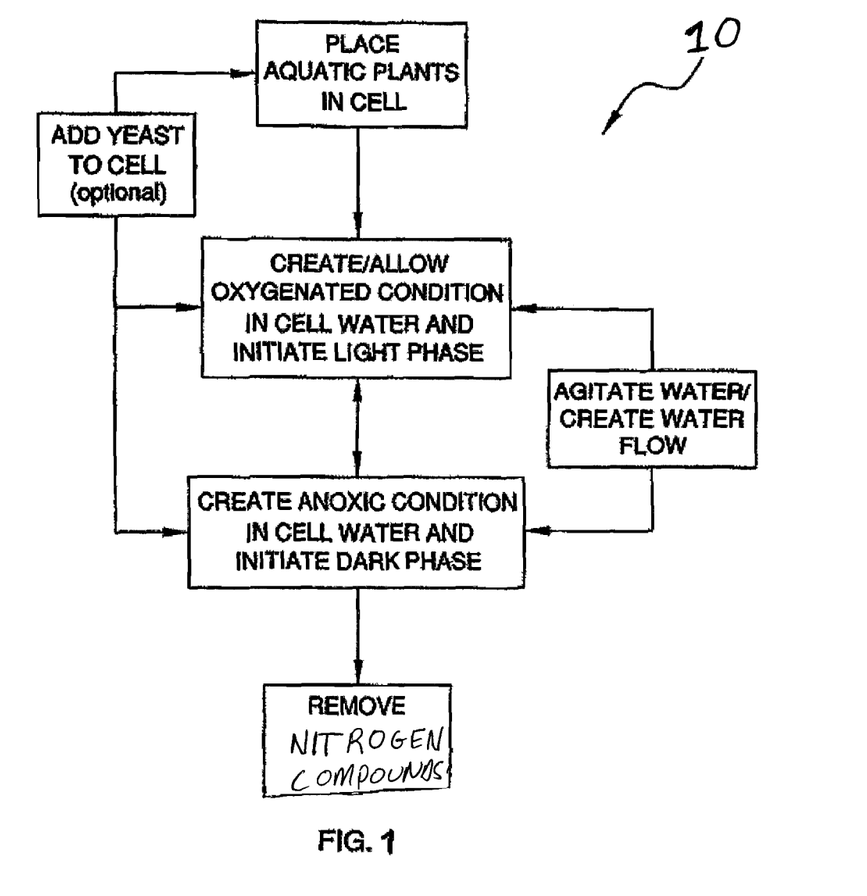
FIG. 1 is a schematic view of a nitrogen compound production method and system according to an embodiment of the disclosure.
Figure 2:
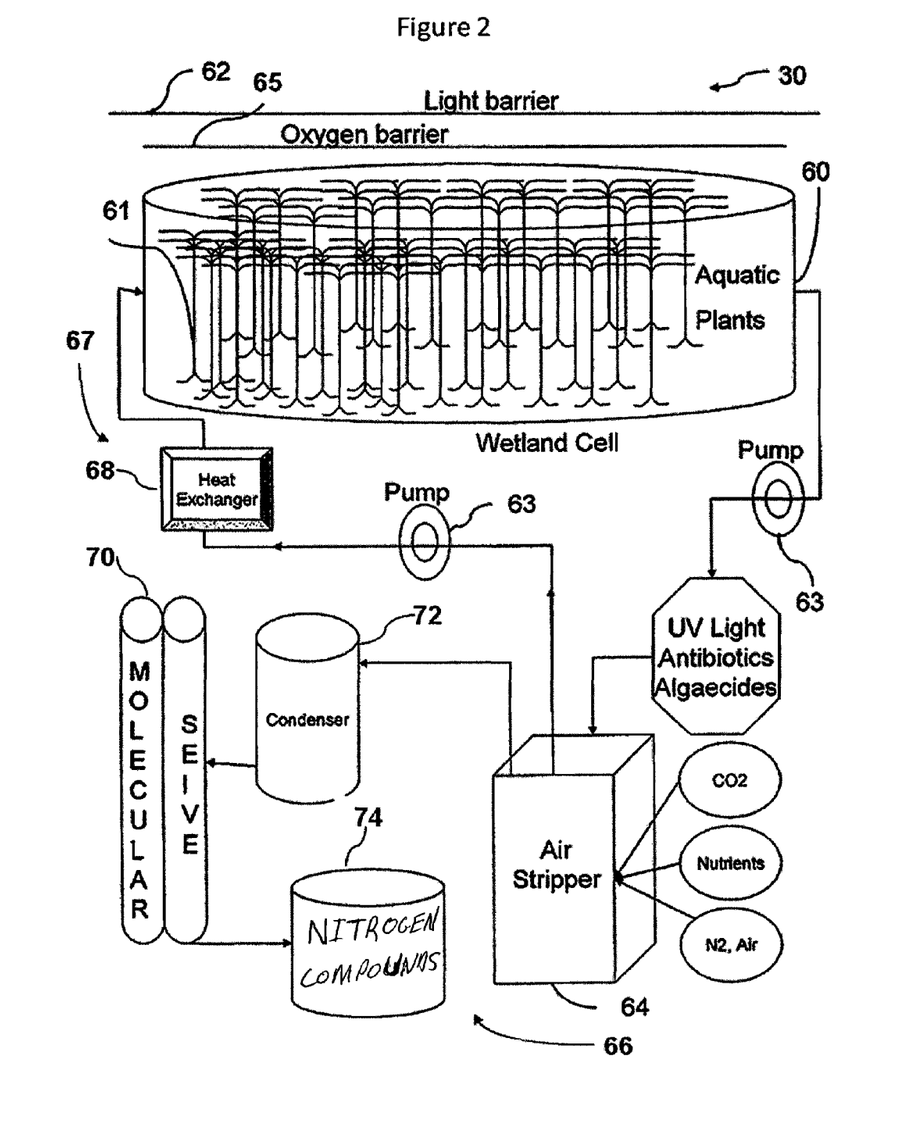
FIG. 2 is a schematic view of an embodiment of the disclosure.
Figure 3:
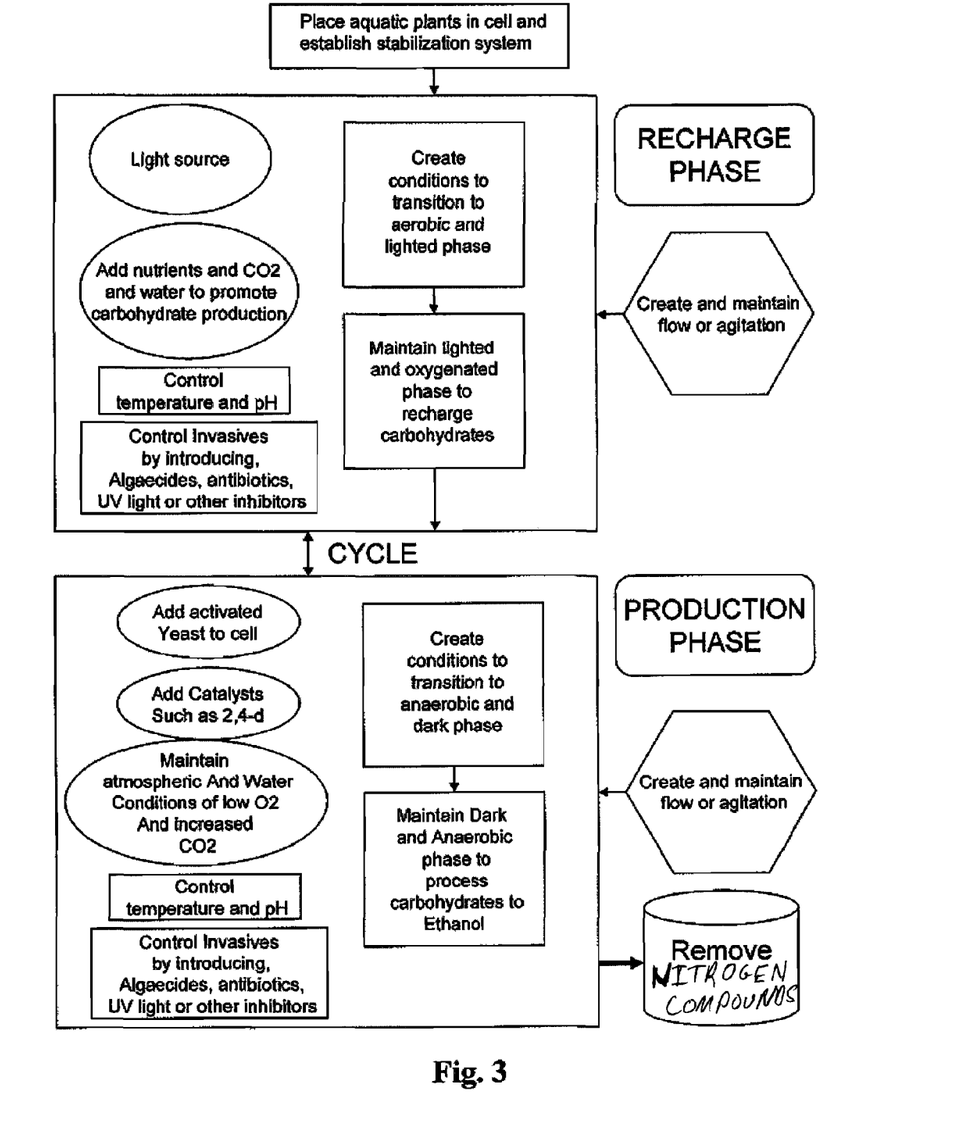
FIG. 3 is a schematic view of an embodiment of the disclosure.

FIG. 2 depicts one system 30 particularly well suited for use with a single cell, though it should be understood that this system may also be used with multiple cells. This system 30 generally includes a cell 60 containing water and at least one aquatic plant 61, and a nitrogen removal assembly 66 in fluid communication with the cell 60. The cell 60 may be sunken into the ground surface or in a dwelling foundation, a partially sunken tank structure or a fully above ground tank structure. The cell 60 may have any particular shape, though a circular or loop type cell may be beneficial for encouraging the movement of water within the cell 60. The water may be moved in a conventional manner though one utilizing a gravity lift system may prove to be beneficial due to its lower power requirements. The system 30 further includes one or more sealing barriers 65, which inhibit the movement of gasses such as oxygen and/or CO2 into and out of the cell.

A photosynthetic light regulating system 62 is utilized to selectively allow/inhibit photosynthetic inducing light into the cell. A number of light regulation means are discussed with respect to the method 10, any of which may constitute all or a part of the light regulating system 62. For example, the light regulating system 62 can include a light-blocking cover or barrier over one or more cells 60. Alternatively or additionally, the light regulating system 62 includes a structure in which the cell 60 is housed or contained. It is to be understood that the light regulating system 62 can, but is not required to, inhibit all light from reaching a plant of the system. Rather the light regulating system 62 may only inhibit light at a wavelength or intensity that would induce photosynthesis in a plant of the system. For example, the light regulating system 62 can be a filter that allows only wavelengths that do not induce photosynthesis to pass. Examples of wavelengths that induce photosynthesis include wavelengths from about 380 nm to about 710 nm. Depending on the plant being used in the system 30, the range of wavelengths that induce photosynthesis can be broader or narrower, but can be ascertained using known methods. In one embodiment, the sealing barrier 65 and the light regulating system 62 constitute a single structure that may or may not be separable.

Figure 5:
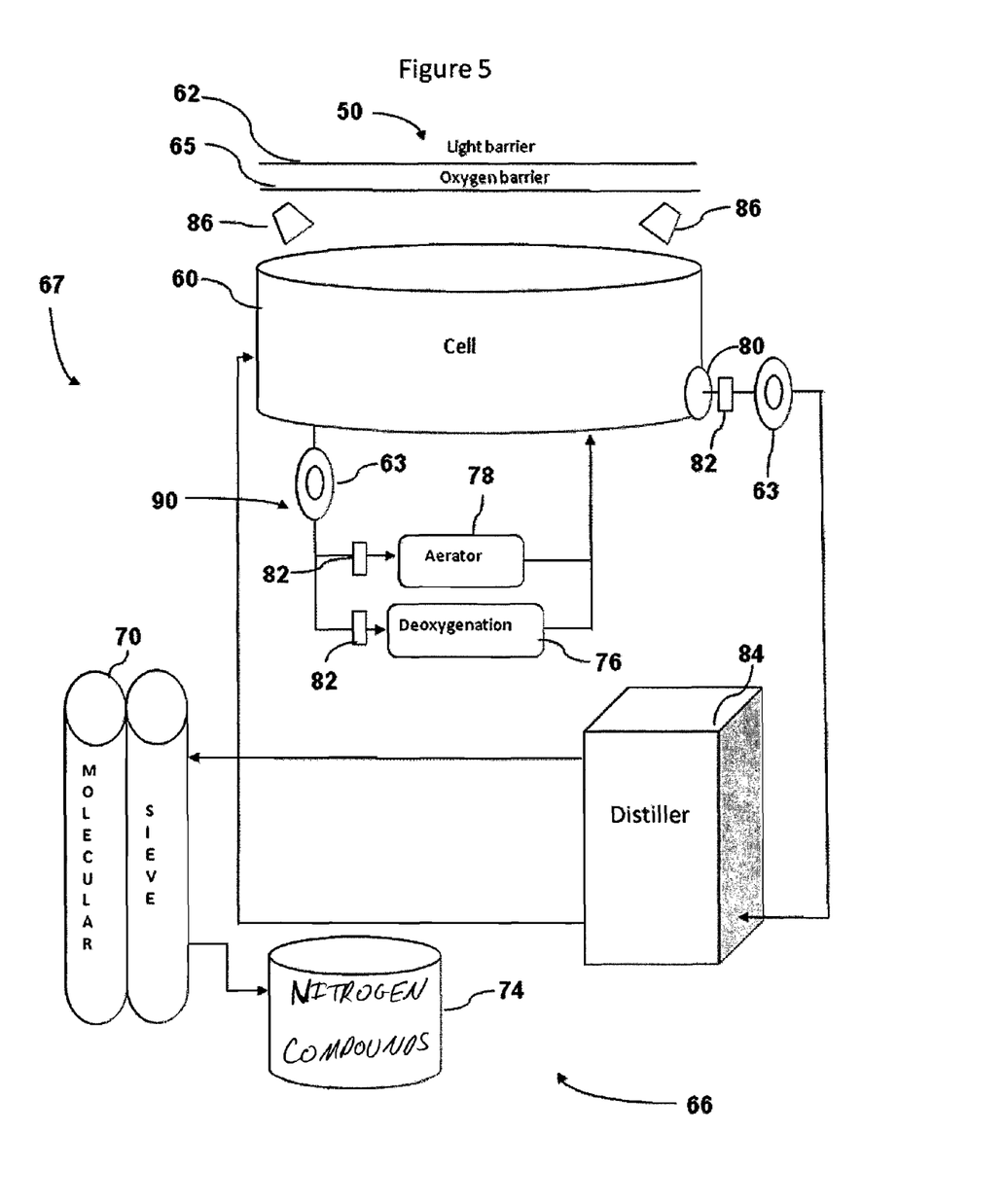
FIG. 5 is a schematic view of an embodiment of the disclosure.

The light regulating system 62 can be configured to be adjustable to allow photosynthesis-inducing light at some time points, such as during aerobic metabolism or to induce aerobic metabolism, while inhibiting photosynthesis-inducing light at other time points, such as during anaerobic metabolism or to induce anaerobic metabolism. For example, the light regulating system 62 can be removable. In another example, the light regulating system 62 can be electrochromic, such that opacity or color of the apparatus can be controlled by the application of electric current. In some embodiments, the light regulating system 62 can include an artificial light source 86 such as shown in FIG. 5 to provide photosynthesis-inducing light and/or light that does not induce photosynthesis. Such an artificial light source 86 can be configured to emit light at an intensity or spectrum appropriate for the desired condition. For example, an artificial light source 86 can emit light at low intensity or having a wavelength outside of the range of photosynthesis-inducing light for a plant of the system during a period of anaerobic metabolism or to induce anaerobic metabolism. Similarly, artificial lighting can emit light at an intensity or at a wavelength for photosynthesis induction during aerobic metabolism of a plant of the system or to induce aerobic metabolism.

A heat source such as a heat exchanger 68 may be used to obtain an optimal temperature for the particular aquatic plant 61 or plants being used. Other suitable heat sources include conventional water heaters, geothermal energy sources, solar energy sources and waste heat from conventional electrical and petroleum facilities. Water may be pulled out from and reintroduced into the cell by pumps 63 through a closed loop system 67 to provide fluid communication between the cell 60 and the nitrogen compound removal assembly. The closed loop system 67 may include an access point to the water to allow all additives discussed above to be supplied to the water without over exposing the water to the atmosphere. Alternatively, the cell 60 may include an access point.

The nitrogen compound removal assembly 66 may include a variety systems and system components that are capable of extracting and collecting nitrogen compounds from the water. In the illustrated embodiment, the assembly 66 includes one or more air strippers (also known as gas strippers) 64 that function to separate nitrogen compounds from water. The gas stripper 64 (e.g., atmospheric air-, $N_2$-, or $CO_2$-based gas stripper) is in fluid communication with one or more of a condenser 72 for capturing nitrogen compound vapor, a molecular sieve 70 for purifying the vapor, and/or a container 74 to store the nitrogen compounds. A pervaporator (not shown) could also be used if desired. The assembly 66 allows the nitrogen compounds to be removed continuously without interrupting the anaerobic and aerobic processes being carried out in the cell. The gas stripper 64 may be further utilized to allow for the introduction of $CO_2$, nitrogen, and nutrients into the water as well. Though shown outside of the cell 60, the gas stripper 64 may be positioned within the cell 60 to prevent the need to remove the water from the cell 60. Prior to introducing water back into the cell 60, it may be exposed to ultraviolet light and/or antibiotics and algaecides may be added to maintain a healthy cell 60 free of unwanted bacterial and algae growths. In some embodiments, the nitrogen compound storage container 74 is replaced with an assembly for distributing the nitrogen compounds for use or transportation (not shown).

Figure 4:
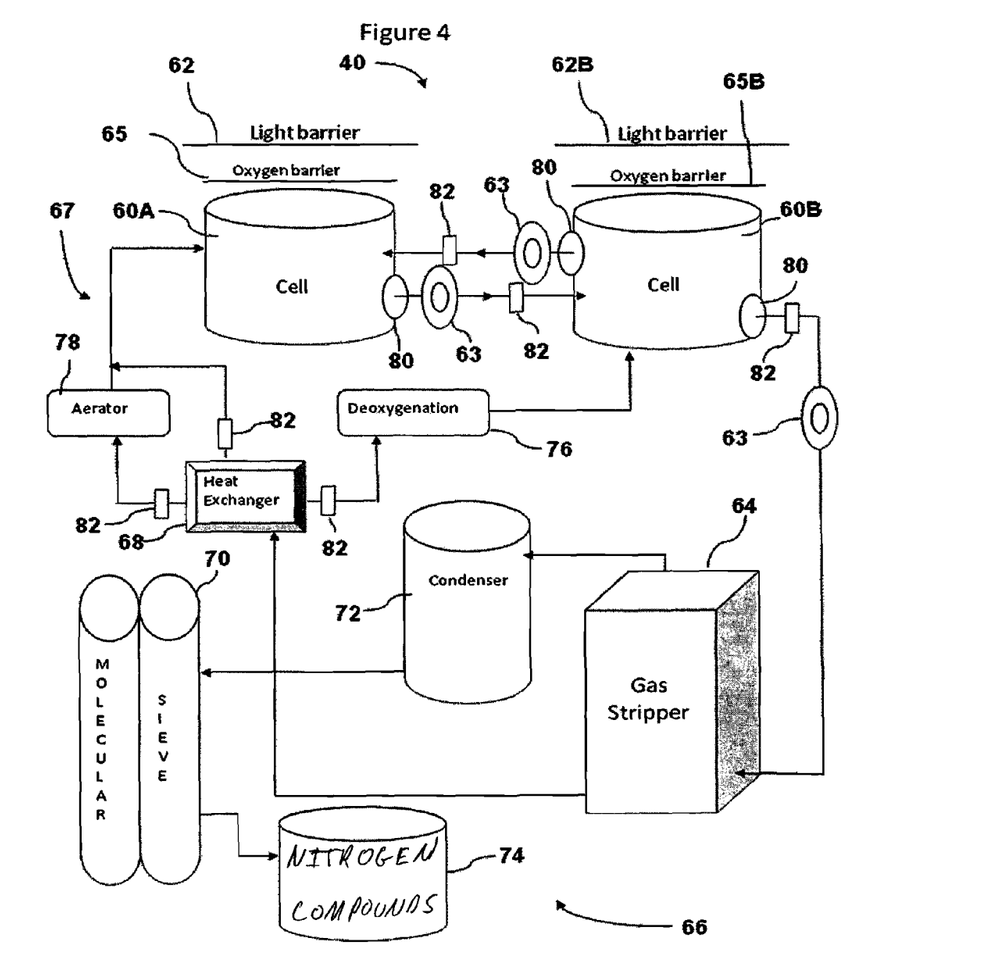
FIG. 4 is a schematic view of an embodiment of the disclosure.

FIG. 4 depicts a system 40 that is similar in overall structure and function as system 30, but includes two or more cells 60A, 60B, some or all of which are directly or indirectly connected in fluid communication with one another. The cells 60A, 60B can be connected by any appropriate means. In some embodiments, two or more cells are connected by a common permeable wall. In another embodiment, two or more cells are connected by fluid conduits. The connection can be severable. For example, two or more cells can be connected by a pipe that includes a closable valve 82 to disrupt fluid communication between the two or more cells 60A, 60B. In some embodiments one cell 60A or 60B serves as a source of oxygenated water or anoxic water for the other cell 60A or 60B via the fluid conduits.

In some embodiments, a closed loop system 67 similar to that used in system 30 can be implemented to provide fluid communication between the nitrogen compound removal assembly 66 and the cells 60A, 60B. As shown, cells 60A, 60B and nitrogen compound removal assembly 66 are connected such that water from cell 60B is delivered to the nitrogen compound removal assembly 66, and the water remaining after extracting the nitrogen compounds is returned to cell 60A. In an alternate embodiment, each of cells 60A and 60B may be independently in fluid communication with the nitrogen compound removal assembly 66.

Additional components shown in FIG. 4 that may be used in system 30, 40 or 50 include an aerator 78, an oxygen removal apparatus 76 (e.g., a vacuum pump) and/or one or more filters 80 for removing particulate matter, such as plant material, substrate, and microorganisms (e.g., yeast or bacteria). The nitrogen removal assembly 66 shown in FIG. 4 may function similarly to the assembly described with respect to FIG. 2.

FIG. 5 depicts system 50 that includes a closed loop system 67 between cell 60 and nitrogen compound removal assembly 66 that is similar to the closed loop system 67 illustrated in FIG. 2. The system further includes a circulation loop 90 having an aerator 78 and/or an oxygen removal apparatus 76 to treat water moved through the circulation loop 90 by pump 63. In some embodiments, the oxygen removal apparatus 76 is replaced by a source of anoxic water (not shown) and/or the aerator 78 is replaced by a source of oxygenated water. A circulation loop 90 can be configured for the introduction of additives or to include components for the removal of oxygen from water. In some embodiments, a valve 82 is included in the circulation loop 90 to adjust the flow rate and direction of water in the circulation loop 90. The circulation loop 90 may also function to agitate the water in the cell, or a separate water agitator may be contained in the cell. As previously described with respect to system 30, system 50 includes an artificial light source 86 that serves as a light regulating system 62 alone or in conjunction with light barriers, etc. In particular, artificial light source 86 may provide photosynthesis-inducing light during a light period and/or non-photosynthesis-inducing light during a dark period.

The nitrogen compound removal assembly of system 50 differs from those illustrated in FIGS. 2 and 4 in that a distiller 84 (e.g. a distillation column) is utilized instead of a gas stripper. A distiller and/or a gas stripper could be utilized in any of the illustrated systems. For example, a gas stripper 64 can be included in a system at a point where the concentration of nitrogen compounds is relatively low, while a distiller 84 can be included in a system at a point where the concentration of nitrogen compounds is higher. A nitrogen compound removal assembly can be included in any point of a system and in any combination appropriate to remove nitrogen compounds from water in the system. In some embodiments, a nitrogen compound removal assembly is included at multiple points in a system.

In a further embodiment, the nitrogen compound removal assembly of any of the illustrated systems can use one or more nitrogen compound absorptive collection systems alone or in combination with any of the other components disclosed herein. Generally speaking, nitrogen compound absorptive collection systems utilize membrane or other absorption technology to separate nitrogen compounds from water and other extraneous materials.

The systems 30, 40, 50 can be integrated or associated with various other systems. For example, the systems 30, 40, 50 can be configured to sequester waste heat emitted by adjacent ethanol processing plants or any other convenient source of waste heat. In another example, the systems 30, 40, 50 are associated with a wastewater treatment plant, which typically has a constant source of water at a stable temperature of about 50° Fahrenheit to about 85° Fahrenheit. Waste water from electrical facilities may also be utilized. When associated with a wastewater source, water in a cell 60 can be regulated by heat exchange from the wastewater, or wastewater can be used directly in the cell 60 before or after initial wastewater treatment. In addition to providing a water source with a higher temperature, wastewater sources may also have nutrient concentrations that are favorable to plant growth.

It will be evident that the various components of systems 30, 40, 50 described herein can be used in various combinations to carry out the method 20. Additionally, conventional components can be included for controlling water flow, removing particulates, monitoring and/or maintaining water parameters (e.g., pH), monitoring ethanol concentration, monitoring nitrogen compound concentration, monitoring and/or maintaining plant parameters, cutting, damaging or removing plants, and the like. For example, a system 30 provided herein can include components such as valves 82, filters 80, light sensors and/or meters (e.g., photosynthetically active radiation sensor), pH meters, and the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A method of nitrogen fertilizer compound production and collection from an aquatic plant, said method comprising the steps of:
    placing at least one aquatic plant selected from the family Potamogetonaceae in a container containing water,
    creating and maintaining an anoxic condition within said water to initiate and maintain anaerobic plant metabolism to produce nitrogen compounds and inhibit aerobic plant metabolism, said aquatic plants releasing nitrogen compounds into the water during said anoxic condition,
    creating and maintaining an oxygenated condition within said container to stimulate aerobic plant metabolism to produce and store carbohydrates and inhibit anaerobic plant metabolism during said oxygenated condition,
    repeating the steps of creating and maintaining anoxic and oxygenated conditions one or more times to repeatedly release nitrogen compounds into the water,
    recovering nitrogen compounds from said water.

2. The method of claim 1, wherein a photosynthetic light inhibiting apparatus positioned between a light source and the at least one aquatic plant inhibits photosynthesis inducing light from reaching said at least one aquatic plant.

3. The method of claim 1, wherein a sealing barrier positioned between an oxygen source and said at least one aquatic plant inhibits oxygen from entering said water.

4. The method according to claim 1, wherein said step of creating and maintaining an anoxic condition includes a step of inhibiting photosynthesis inducing light from reaching said at least one aquatic plant.

5. The method according to claim 4, wherein said step of creating and maintaining an anoxic condition includes a step of inhibiting oxygen from entering the water.

6. The method according to claim 1, wherein the step of creating and maintaining the anoxic condition comprises introducing anoxic water into the container.

7. The method according to claim 1, wherein the step of creating and maintaining the anoxic condition comprises introducing yeast into the container.

8. The method according to claim 1, wherein the step of creating and maintaining the anoxic condition comprises mechanically removing oxygen from the water in the container.

9. The method according to claim 1, wherein the step of creating and maintaining the anoxic condition comprises a step limiting the diffusion of light into the container during the anoxic condition.

10. The method according to claim 1, wherein the step of creating and maintaining and oxygenated condition comprises a step of adding N2 or complex nitrogen compounds into the container.

* * * * *